US012105705B2

(12) United States Patent
Li et al.

(10) Patent No.: US 12,105,705 B2
(45) Date of Patent: Oct. 1, 2024

(54) DATABASE QUERY PROCESSING WITH DATABASE CLIENTS

(71) Applicant: INTERNATIONAL BUSINESS MACHINES CORPORATION, Armonk, NY (US)

(72) Inventors: Shuo Li, Beijing (CN); Xiaobo Wang, Beijing (CN); Sheng Yan Sun, Beijing (CN); Ping Wang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 17/842,230

(22) Filed: Jun. 16, 2022

(65) Prior Publication Data

US 2023/0409575 A1 Dec. 21, 2023

(51) Int. Cl.
*G06F 16/2453* (2019.01)
(52) U.S. Cl.
CPC .. *G06F 16/24542* (2019.01); *G06F 16/24535* (2019.01)
(58) Field of Classification Search
CPC ............ G06F 16/24542; G06F 16/24535
See application file for complete search history.

(56) References Cited

U.S. PATENT DOCUMENTS

| 9,244,971 | B1* | 1/2016 | Kalki | G06F 3/0482 |
| 9,436,735 | B1* | 9/2016 | Feng | G06F 16/24545 |
| 9,569,496 | B1* | 2/2017 | Li | G06F 16/24535 |
| 10,949,197 | B1* | 3/2021 | Wang | G06F 16/213 |
| 11,016,688 | B1* | 5/2021 | Gray | G06F 3/0646 |
| 2004/0019587 | A1* | 1/2004 | Fuh | G06F 16/24547 |
| 2007/0219973 | A1* | 9/2007 | Cui | G06F 16/2435 |
| 2012/0317293 | A1* | 12/2012 | Gu | H04W 76/14 |
| | | | | 709/226 |

(Continued)

FOREIGN PATENT DOCUMENTS

| CN | 102135988 A | 7/2011 |
| CN | 106446134 B | 7/2019 |

(Continued)

OTHER PUBLICATIONS

International Search Report and Written Opinion, International Application No. PCT/CN023/098626, International Filing Date Jun. 6, 2023.

(Continued)

*Primary Examiner* — Brittany N Allen
*Assistant Examiner* — William P Bartlett
(74) *Attorney, Agent, or Firm* — Amin, Turocy & Watson, LLP (57) ABSTRACT

Embodiments of the present disclosure describe an approach for database query processing with database clients. According to the approach, a first set of queries are obtained from a plurality of clients in communication with a database server. A second set of queries are generated by normalizing the first set of queries. A set of access paths corresponding to the second set of queries are determined for retrieving data from at least one of the plurality of clients and the database server. Data is retrieved from at least one of the plurality of clients and the database server based on the set of access paths.

20 Claims, 6 Drawing Sheets

(56) References Cited

U.S. PATENT DOCUMENTS

| | | | |
|---|---|---|---|
| 2014/0012988 A1 | 1/2014 | Kruempelmann | |
| 2016/0103914 A1 | 4/2016 | Im | |
| 2016/0292226 A1* | 10/2016 | Konik | G06F 16/25 |
| 2017/0017686 A1 | 1/2017 | Feng | |
| 2017/0075957 A1* | 3/2017 | Li | G06F 16/24568 |
| 2020/0349161 A1* | 11/2020 | Siddiqui | G06F 16/211 |

FOREIGN PATENT DOCUMENTS

| | | |
|---|---|---|
| CN | 110321364 A | 10/2019 |
| CN | 111090672 A | 5/2020 |

OTHER PUBLICATIONS

"Pushdown computations in PolyBase", Microsoft Docs, Oct. 19, 2021, 9 pages, <https://docs.microsoft.com/en-us/sql/relational-databases/polybase/polybase-pushdown-computation?view=sql-server-ver15>.

Ding et al., "CIAO: An Optimization Framework for Client-Assisted Data Loading", arXiv:2102.11793v1 [cs.DB], Feb. 23, 2021, 12 pages.

Mell et al., "The NIST Definition of Cloud Computing", Recommendations of the National Institute of Standards and Technology, Special Publication 800-145, Sep. 2011, 7 pages.

\* cited by examiner

| PLANNO | METHOD | TNAME | ACCESSTYPE | MATCHCOLS | ACCESSNAME | INDEXONLY | SORTN_UNIQ | SORTN_JOIN | QBLOCK_TYPE | TABLE_TYPE |
|---|---|---|---|---|---|---|---|---|---|---|
| 1 | Leading | Table_Child | R-Scan | 0 | | N | N | N | SELECT | T |
| 2 | NLJ | Table_Parent | Index access | 1 | Parent_IDX | Y | N | Y | SELECT | T |

620 ↘

| PLANNO | METHOD | TNAME | ACCESSTYPE | MATCHCOLS | ACCESSNAME | INDEXONLY | SORTN_UNIQ | SORTN_JOIN | QBLOCK_TYPE | TABLE_TYPE |
|---|---|---|---|---|---|---|---|---|---|---|
| 1 | Leading | House | R-Scan | 0 | | N | N | N | SELECT | T |
| 2 | NLJ | Street | Index access | 1 | Street_IDX | Y | N | Y | SELECT | T |
| 3 | NLJ | District | R-Scan | 0 | | N | N | N | SELECT | T |

FIG. 6

DATABASE QUERY PROCESSING WITH DATABASE CLIENTS

BACKGROUND

The present disclosure relates to database, and more specifically, to database query processing with database clients.

Generally, database clients send database query requests to a database server to retrieve data from the database server. The database server processes the database query requests and performs associated database queries on the server-side due to its great computing/storage/network resources. However, database clients nowadays have evolved with strong capabilities as well, such that the resources of the database clients may be wasted when all of the processing of the queries is performed on the server-side. Thus, great efforts are needed to make use of the resources of the database clients to reduce pressure on the database server.

SUMMARY

According to one embodiment of the present disclosure, there is provided a computer-implemented method. According to the method, one or more processors obtain a first set of queries from a plurality of clients in communication with a database server. The one or more processors generate a second set of queries by normalizing the first set of queries. The one or more processors determine a set of access paths corresponding to the second set of queries. The one or more processors retrieve data from at least one of the plurality of clients and the database server based on the set of access paths.

According to another embodiment of the present disclosure, there is provided a system. The system comprises a processing unit and a memory coupled to the processing unit. The memory stores instructions that, when executed by the processing unit, perform actions comprising: obtaining a first set of queries from a plurality of clients in communication with a database server; generating a second set of queries by normalizing the first set of queries; determining a set of access paths corresponding to the second set of queries; and retrieving data from at least one of the plurality of clients and the database server based on the set of access paths.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: obtaining a first set of queries from a plurality of clients in communication with a database server; generating a second set of queries by normalizing the first set of queries; determining a set of access paths corresponding to the second set of queries; and retrieving data from at least one of the plurality of clients and the database server based on the set of access paths.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
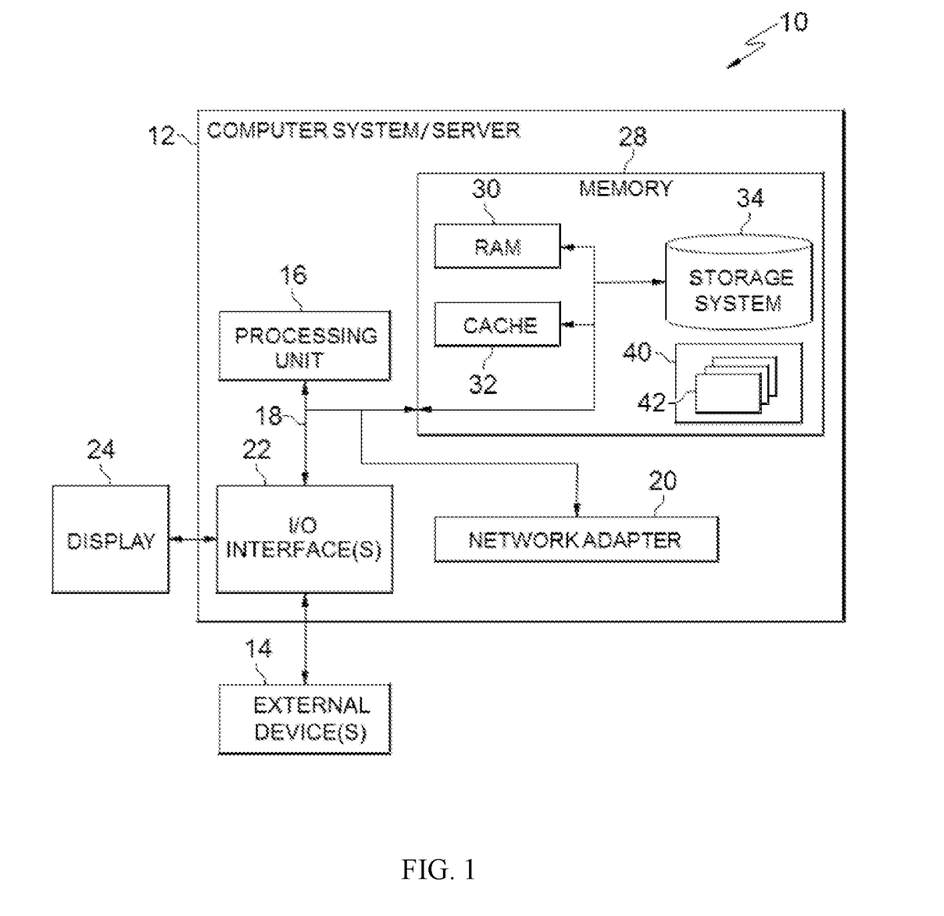
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
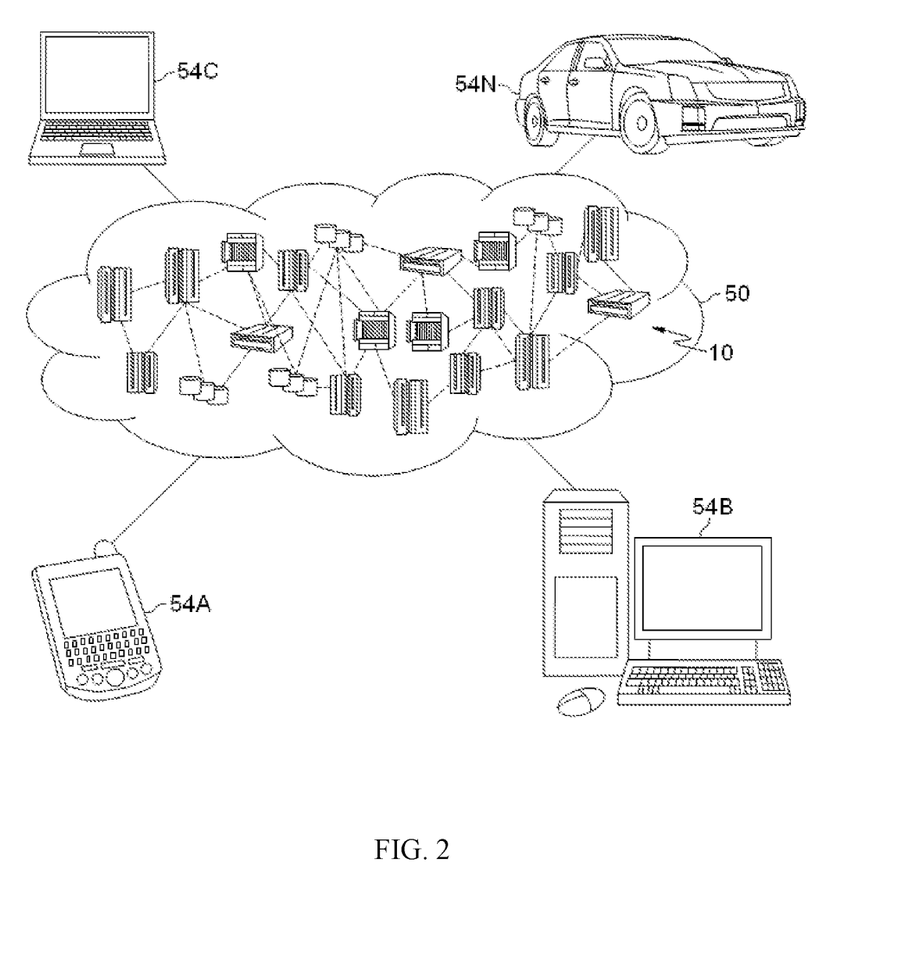
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
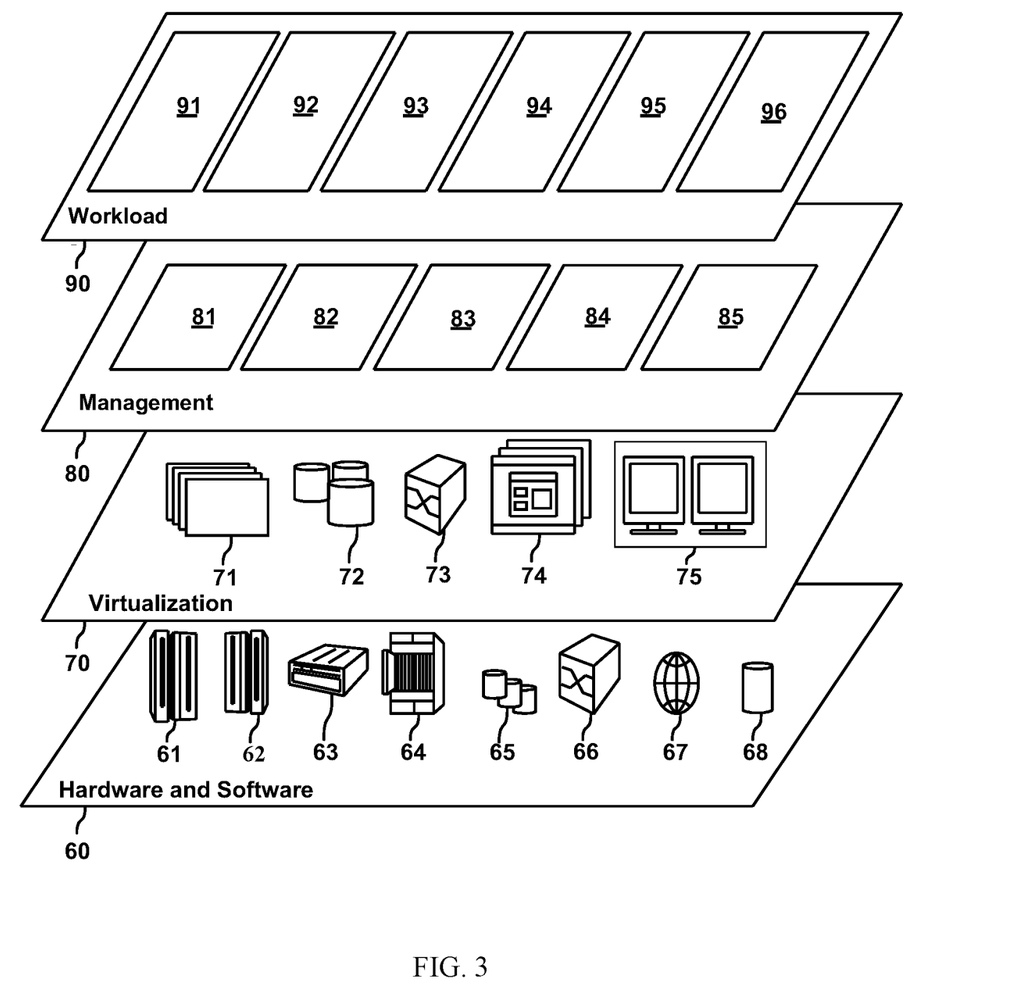
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer may include: mapping and navigation 91; software development and lifecycle management 92; virtual classroom education delivery 93; data analytics processing 94; transaction processing 95; and database query processing 96. Hereinafter, reference will be made to FIG. 4-6 to describe details of database query processing 96.

As described above, it is expected to make use of the resources of the database clients to relieve pressure on the database server. Embodiments of the present disclosure can provide a solution for database query processing with the database clients. According to some embodiments, a first set of queries can be obtained from a plurality of clients in communication with a database server. A second set of queries can be generated by normalizing the first set of queries. A set of access paths corresponding to the second set of queries can be determined for retrieving data from at least one of the plurality of clients and the database server. A query request can be sent to the database server to retrieve data based on the set of access paths.

In this way, by normalizing the first set of queries and determining access paths on the client-side, the resources of the database clients can be utilized to reduce the pressure on the database server. Moreover, with the queries being normalized, fewer query requests can be sent to the database server such that network resource consumption can be reduced. In addition, with local data in the database clients, query performance can be improved due to less data retrieval from the database server.

Figure 4:
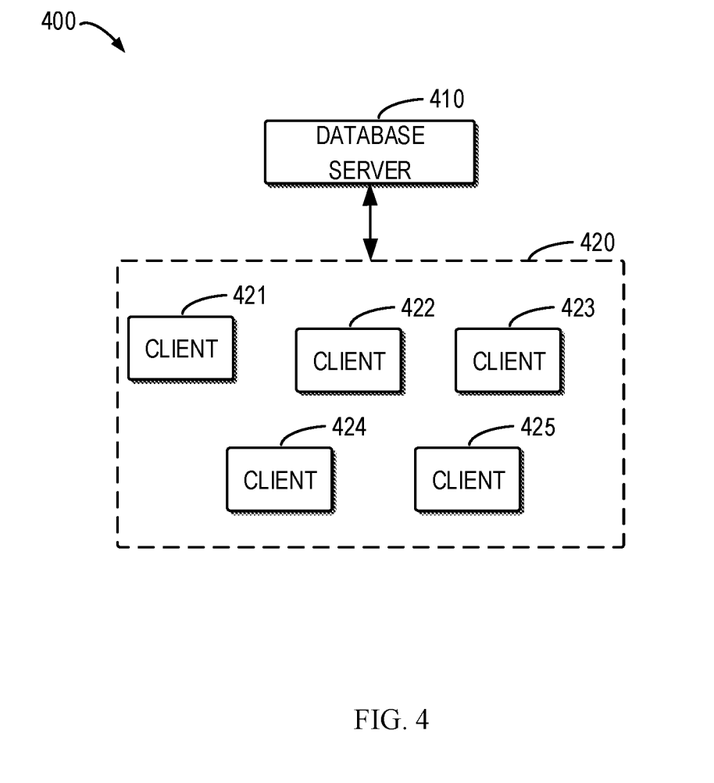
FIG. 4 depicts an example environment for implementing the database query processing with the database clients according to embodiments of the present disclosure.

With reference now to FIG. 4, an example environment 400 in which embodiments of the present disclosure can be implemented is shown. It is to be understood that the elements of the environment 400 are described only for the purpose of illustration without suggesting any limitations as to the scope of the present disclosure. The embodiments of the present disclosure can be embodied with different elements. For example, at least part or all of the environment 400 can be implemented by computer system/server 12 of FIG. 1.

As shown in FIG. 4, the environment 400 can include a database server 410 and a plurality of clients 420 (e.g., clients 421-425) in communication with the database server 410. The database server 410 and each of the plurality of clients 420 can be implemented by computer system/server 12 of FIG. 1. The plurality of clients 420 can be a cluster or a network of edge nodes in communication. The plurality of clients 420 can comprise intelligent devices or machines with certain network bandwidth, storage and computing resources.

The database server 410 and the plurality of clients 420 can communicate via any communication link, such as one or more networks such as a local area network (LAN), a general wide area network (WAN), and/or a public network (e.g., the Internet). The plurality of clients 420 can send, via the communication link, query requests to the database server 410 and can receive data retrieved from the database server 410.

Figure 5:
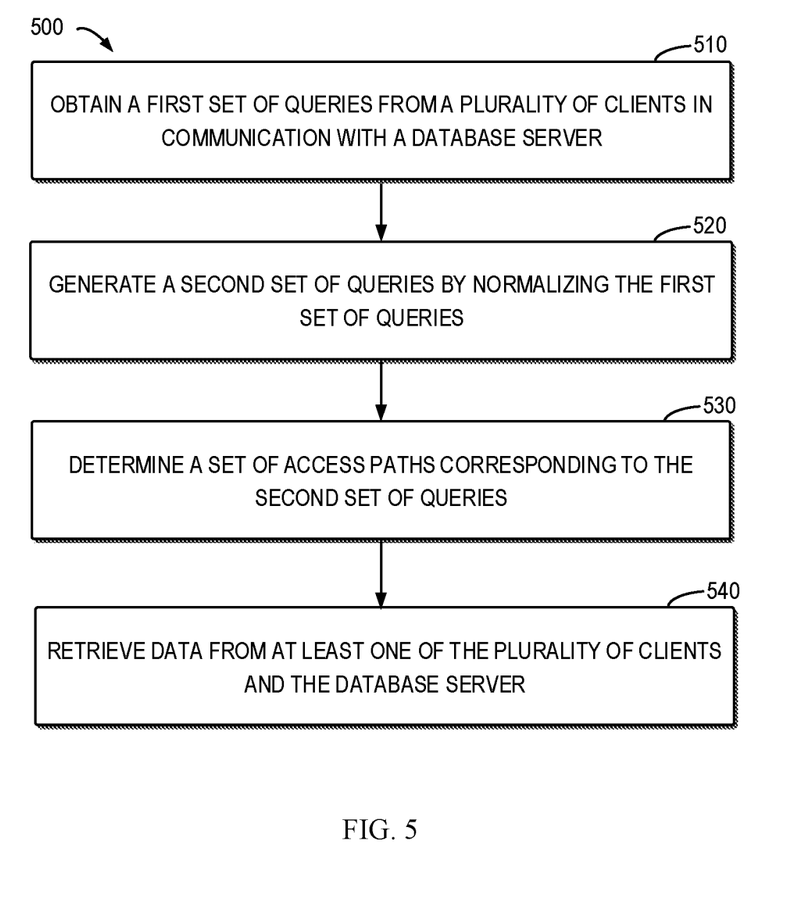
FIG. 5 depicts a flowchart of an example method for the database query processing with the database clients according to embodiments of the present disclosure.

FIG. 5 depicts a flowchart of an example method 500 for database query processing with database clients according to embodiments of the present disclosure. The method 500 can be implemented at any suitable client of the plurality of clients 420 as shown in FIG. 4. It is to be understood that the method 500 can also comprise additional blocks (not shown) and/or can omit the illustrated blocks. The scope of the present disclosure described herein is not limited in this aspect.

The client implementing the method 500 can be referred to as a primary client hereinafter. The primary client can be determined based on the resources of the plurality of clients 420. For example, a client with the greatest computing resources can be identified as the primary client. As another example, a client being currently with the lowest resource usage can be identified as the primary client. For ease of illustration, the method 500 can be described hereinafter with reference to FIG. 4 and the client 421 can be identified as the primary client.

At block 510, the client 421 can obtain a first set of queries from the plurality of clients 420 in communication with the database server 410. The first set of queries can be sent from one or more of the plurality of clients 420. The one or more clients can send their queries to the client 421 in response to receiving a message indicating that the client 421 is the primary client. In some embodiments, the first set of queries can comprise a query generated from the client 421. Alternatively, the first set of queries can be sent from other clients of the plurality of clients 420. Each of the first set of queries can indicate retrieving respective data.

At block 520, the client 421 can generate a second set of queries by normalizing the first set of queries. The second set of queries can comprise one or more normalized queries. Additionally, the second set of queries can comprise one or more original queries in the first set of queries that are not normalized.

In some embodiments, the client 421 may normalize the first set of queries by substituting database object names in the queries with a same name Examples of the database object may comprise tables, indexes, stored procedures, sequences, views and many more.

In some embodiments, the client 421 can identify, from the first set of queries, one or more queries that can be normalized by substituting database object names based on predetermined rules. The predetermined rules can be defined by developers. For example, the developers can specify that one or more table names can be normalized to a common name due to a high similarity among the one or more tables.

Alternatively, or in addition, the predetermined rules can be determined based on historical queries and corresponding access paths. For example, historical queries with similar access paths can be identified and thus the database object names to be normalized in the queries can be determined.

Figure 6:
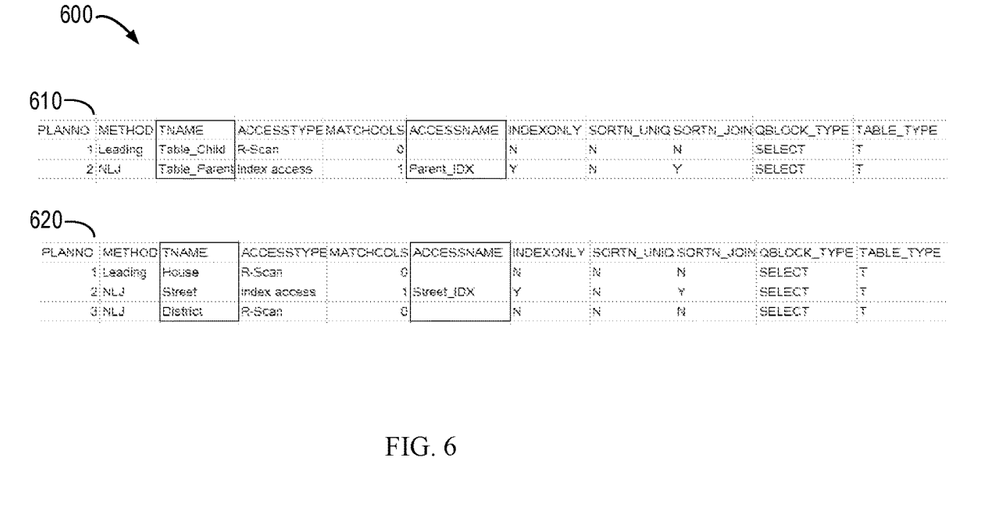
FIG. 6 depicts an example of query normalization according to embodiments of the present disclosure.

FIG. 6 depicts an example of query normalization according to some embodiments of the present disclosure. As can be seen from FIG. 6, execution plan 610 and execution plan 620 have similar access paths. For example, PLANNO1 in both execution plan 610 and execution plan 620 involves similar access paths accessing different tables (i.e., Table_Child and House). PLANNO2 in both execution plan 610 and execution plan 620 involves similar access paths accessing different tables (i.e., Table_Parent and Street). In this case, the table names of Table_Child and House in the queries can be substituted with a same name (e.g., TAB #1), and the table names of Table_Parent and Street in the queries can be substituted with a same name (e.g., TAB #2).

In some embodiments, the client 421 can normalize the first set of queries by identifying a sub-query that is comprised in at least two of the first set of queries. In other words, a common sub-query can be identified for subsequent processing. For example, if a first query and a second query in the first set of queries have a common sub-query, the common sub-query can be identified as one of the second set of queries. As another example, if a sub-query in the first query is the same as a third query in the first set of queries, the sub-query can be identified as one of the second set of queries.

It is to be noted that query normalization can be performed in any other suitable ways to group queries for common subsequent processing to reduce resource consumption. For example, predicate values in the queries can be removed or replaced by question marks. As another example, functions in where-condition and sub-queries can be normalized. As another example, case-when structure can be normalized by removing values or replacing values with question marks. The scope of the present disclosure described herein is not limited in this aspect.

Referring back to FIG. 5, at block 530, the client 421 can determine a set of access paths corresponding to the second set of queries. In some embodiments, an access path can indicate a path for retrieving data from the plurality of clients 420. Alternatively, the access path can indicate a path for retrieving data from the database server 410. Alternatively, the access path can indicate a path for retrieving data from both the plurality of clients 420 and the database server 410.

In some embodiments, the plurality of clients 420 can store at least a portion of data to be retrieved by the queries due to historical operations. The portion of data can be scattered on the plurality of clients 420. For example, the client 422 can have retrieved pieces of data from the database server 410 in previous operations and a query sent from the client 423 indicates to retrieve the same pieces of data.

In some embodiments, for each of the second set of queries, the client 421 can determine a corresponding access path based on a comparison between the query and a plurality of historical queries with known access paths. The historical queries and corresponding access paths can be stored in one or more clients of the plurality of clients 420. The client 421 can identify, from the plurality of historical queries, a historical query that is the same as the query and can obtain its corresponding access path as the access path for the query. In some embodiments, the historical queries can comprise normalized queries. In some embodiments, the historical queries can comprise original queries.

In some embodiments, the client 421 can determine the set of access paths corresponding to the second set of queries by reusing the access path of a sub-query. For example, if the second set of queries comprise a first query, a second query and a common sub-query in the first query and the second query, the client 421 can determine the access path corresponding to the sub-query first and then reuse the access path when determining the access path corresponding to the first query and the access path corresponding to the second query.

In some embodiments, the client 421 can determine the access path by determining a plurality of candidate access paths and corresponding costs and selecting a candidate access path based on the costs as the access path.

The client 421 can determine the plurality of costs by using a cost model. Each of the plurality of costs can indicate at least one of I/O cost, CPU cost and network cost of the corresponding access path. For example, page cost, scan cost, row cost, general cost can be considered in the cost model.

The cost model can be obtained from the database server 410 and can be synchronized with the database server 410. One or more of the plurality of clients 420 can receive the cost model from the database server 410. The plurality of clients 420 can receive the cost model only once. Alternatively, the plurality of clients 420 can receive the cost model every time once the cost model is updated.

The client 421 can determine the plurality of candidate access path and the costs by using the cost model and remote statistics indicating data stored in the database server 410. The remote statistics can indicate data in the hard disks of the database server 410. Additionally, the remote statistics can indicate data in the memory of the database server 410.

The remote statistics can be obtained from the database server 410 and can be synchronized with the database server 410. The plurality of clients 420 can receive the remote statistics periodically from the database server 410. Alternatively, or in addition, the plurality of clients 420 can receive the remote statistics in response to a trigger event. Additionally, runtime structure and other related information can be pushed down to the plurality of clients 420 for building runtime structure on the client-side.

Alternatively, or in addition, the client 421 can determine the plurality of candidate access paths and corresponding costs based on local statistics indicating data stored in plurality of clients 420. The local statistics can indicate data in the hard disks of the plurality of clients 420. Alternatively, or in addition, the local statistics can indicate data in the memories of the plurality of clients 420.

The client 421 can determine the plurality of candidate access paths and corresponding costs based on the statistics in any suitable ways. The scope of the present disclosure described herein is not limited in this aspect. For example, existing methods used in a rule-based optimizer and/or a cost-based optimizer can be used to determine the candidate access paths and corresponding costs.

In some embodiments, the client 421 can identify a candidate access path as a target access path based on the plurality of costs corresponding to the plurality of candidate access paths. The client 421 can identify a candidate access path with the lowest cost as the target access path. Alternatively, or in addition, the client 421 can identify the target access path based on the costs and further predetermined rules.

In some embodiments, the client 421 can determine a first access path by using the cost model and the local statistics. If it is determined that data to be retrieved by the query already exists in the plurality of clients 420, the client 421 can perform the query directly on the client-side without sending a query request to the database server 410. As such, the network resource can be conserved and the pressure on the database server can be reduced.

In some embodiments, the client 421 can further determine a second access path for the query by using the cost model and the remote statistics. The client 421 can select a better access path from the first access path and the second access path by comparing the respective costs.

At block 540, the client 421 can retrieve data from at least one of the plurality of clients 420 and the database server 410 based on the set of access paths. In some embodiments, the client 421 can perform a query on the client-side and retrieve data from the plurality of clients 420 directly.

In some embodiments, the client 421 can generate one or more query requests to retrieve data from the database server 410 based on the set of access paths. For example, the client 421 can send a query request to the database server 410 to retrieve a portion of data queried by a first query. As another example, the client 421 can send a query request to the database server 410 to retrieve all data queried by a second query.

In some embodiments, a result of the query request can be sent to one or more clients of the plurality of clients 420 (also referred to as distributing client(s)). The distributing client(s) can be identified based on predetermined rules. The predetermined rules can indicate identifying the distributing client(s) based on current resource usage of the plurality of clients 420. For example, a client with the lowest current resource usage can be identified as the distributing client.

The distributing client can receive the result from the database server 410 and can distribute respective data in the data retrieved from the database server 410 to the plurality of clients 420.

In some embodiments, the client 421 can be identified as the distributing client and the client 421 can distribute respective data in the data retrieved from the database server 410 to the plurality of clients 420. In addition, the client 421 can distribute the data retrieved from the plurality of clients 420 to the plurality of clients 420.

In some embodiments, another client (e.g., client 422) of the plurality of clients 420 can be identified as the distributing client, and the client 421 can receive its queried data distributed from the other client.

In some embodiments, the plurality of clients 420 can be in secure communication for resource sharing. The plurality of clients 420 can share trust context such that resources of the plurality of clients 420 can be shared with each other. The secure communication can be established by any suitable methods and the scope of the present disclosure is not limited in this aspect.

For example, with the secure communication, the data to be retrieved can be transmitted from the client 422 to the client 421. As another example, the client 421 can determine the access paths and costs based on local statistics of one or more of the plurality of clients 420. As another example, the client 421 can distribute the retrieved data to the plurality of clients 420 via the secure communication.

Embodiments of the present disclosure can provide a solution for database query processing with the database clients. This solution can allow normalizing queries and determining access paths on the client-side. Accordingly, the resources of the database clients can be utilized to reduce the pressure on the database server. Moreover, with the queries being normalized, fewer query requests can be sent to the database server such that network resource consumption can be reduced. In addition, with local data in the database clients, query performance can be improved due to less data retrieval from the database server.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for real-time database query processing, comprising:
   receiving, by a client device of a group of client devices, from a server device comprising a database, an indication that the client device has been selected as a primary client device of the group of client devices;
   obtaining, by the client device, a first set of queries to the database from a plurality of other client devices of the group of client devices;
   generating, by the client device, a second set of queries by normalizing the first set of queries;
   determining, by the client device, a set of access paths corresponding to the second set of queries, wherein at least one access path of the set of access paths comprises at least one path for retrieving first data from the database previously retrieved and currently stored on at least one client device of the plurality of other client devices, and wherein at least one access path of the set of access paths comprises at least one path for retrieving second data currently stored in the database on the server device;
   determining, by the client device, based on a resource usage cost analysis, that retrieving the first data from the at least one client device of the plurality of other client devices has a lower resource usage cost than retrieving the first data from the server device; and
   retrieving, by the client device, based on the set of access paths, data comprising the first data from the at least one client device of the plurality of other client devices and the second data from the server device.

2. The computer-implemented method of claim 1, wherein the first set of queries comprise at least a first query and a second query and the generating the second set of queries comprises:
   substituting a first database object name in the first query and a second database object name in the second query with a same name to generate a normalized query; and
   determining the normalized query as a query of the second set of queries.

3. The computer-implemented method of claim 1, wherein the generating the second set of queries comprises:
   identifying a sub-query comprised in at least two of the first set of queries; and
   determining the sub-query as a query of the second set of queries.

4. The computer-implemented method of claim 1, wherein the determining the set of access paths corresponding to the second set of queries comprises:
   determining, for a query in the second set of queries, a plurality of candidate access paths and a plurality of corresponding resource usage costs by using a cost model and at least one of local statistics indicating data stored in the group of client devices and remote statistics indicating data stored in the database server; and
   selecting, from the plurality of candidate access paths, a candidate access path as an access path corresponding to the query based on the plurality of corresponding resource usage costs.

5. The computer-implemented method of claim 4, wherein the determining the set of access paths corresponding to the second set of queries further comprises:
   obtaining the remote statistics and the cost model from the database server.

6. The computer-implemented method of claim 1, wherein the resource usage cost analysis is based on at least one of I/O resource usage cost, CPU resource usage cost, or network resource usage cost of respective access paths of the set of access paths.

7. The computer-implemented method of claim 1, wherein the second set of queries comprise a first query, and the determining the set of access paths corresponding to the second set of queries comprises:
   identifying, from a plurality of historical queries with known access paths, a historical query that is the same as the first query; and
   obtaining, from the known access paths, a known access path corresponding to the historical query as an access path corresponding to the first query.

8. The computer-implemented method of claim 1, further comprising:
   distributing, by the client device, respective data in the retrieved data to the plurality of other client devices.

9. The computer-implemented method of claim 1, wherein the group of client devices are in secure communication for resource sharing.

10. A client device, comprising:
    a memory computer executable instructions; and
    a processor that executes at least one of the computer executable instructions to cause the client device to:
      receive, from a server device comprising a database, an indication that the client device has been selected as a primary client device of a group of client devices comprising the client device;
      obtain a first set of queries to the database from a plurality of other client devices of the group of client devices;
      generate a second set of queries by normalizing the first set of queries;
      determine a set of access paths corresponding to the second set of queries, wherein at least one access path of the set of access paths comprises at least one path for retrieving first data from the database previously retrieved and currently stored on at least one client device of the plurality of other client devices, and wherein at least one access path of the set of access paths comprises at least one path for retrieving second data currently stored in the database on the server device;
      determine, based on a resource usage cost analysis, that retrieving the first data from the at least one client device of the plurality of other client devices has a lower resource usage cost than retrieving the first data from the server device; and
      retrieve, based on the set of access paths, data comprising the first data from the at least one client device of the plurality of other client devices and the second data from the server device.

11. The system of claim 10, wherein the first set of queries comprise at least a first query and a second query and generating the second set of queries comprises:
   substituting a first database object name in the first query and a second database object name in the second query with a same name to generate a normalized query; and
   determining the normalized query as a query of the second set of queries.

12. The system of claim 10, wherein the generating the second set of queries comprises:
   identifying a sub-query that is comprised in at least two of the first set of queries; and
   determining the sub-query as a query of the second set of queries.

13. The system of claim 10, wherein the determining the set of access paths corresponding to the second set of queries comprises:
   determining, for a query in the second set of queries, a plurality of candidate access paths and a plurality of corresponding resource usage costs by using a cost model and at least one of local statistics indicating data stored in the group of client devices and remote statistics indicating data stored in the database server; and
   selecting, from the plurality of candidate access paths, a candidate access path as an access path corresponding to the query based on the plurality of corresponding resource usage costs.

14. The system of claim 13, wherein the determining the set of access paths corresponding to the second set of queries further comprises:
   obtaining the remote statistics and the cost model from the database server.

15. The system of claim 10, wherein the resource usage cost analysis is based on at least one of I/O resource usage cost, CPU resource usage cost, or network resource usage cost of respective access paths of the set of access paths.

16. The system of claim 10, wherein the second set of queries comprise a first query, and the determining the set of access paths corresponding to the second set of queries comprises:
   identifying, from a plurality of historical queries with known access paths, a historical query that is the same as the first query; and
   obtaining, from the known access paths, a known access path corresponding to the historical query as an access path corresponding to the first query.

17. The system of claim 10, wherein the computer executable instructions further cause the client device to:
   distributing respective data in the retrieved data to the plurality of other client devices.

18. The system of claim 10, wherein the group of client devices are in secure communication for resource sharing.

19. A non-transitory computer-readable medium having instructions stored thereon that, in response to execution, cause a client device comprising a processor to perform operations comprising:
   receiving, from a server device comprising a database, an indication that the client device has been selected as a primary client device of a group of client devices comprising the client device;
   obtaining a first set of queries to the database from a plurality of other client devices of the group of client devices;
   generating a second set of queries by normalizing the first set of queries, wherein at least one access path of the set of access paths comprises at least one path for retrieving first data from the database previously retrieved and currently stored on at least one client device of the plurality of other client devices, and wherein at least one access path of the set of access paths comprises at least one path for retrieving second data currently stored in the database on the server device;
   determining a set of access paths corresponding to the second set of queries, wherein at least one access path of the set of access paths comprises at least one path for retrieving first data from the database previously retrieved and currently stored on at least one client device of the plurality of other client devices, and wherein at least one access path of the set of access paths comprises at least one path for retrieving second data currently stored in the database on the server device;
   determining, based on a resource usage cost analysis, that retrieving the first data from the at least one client device of the plurality of other client devices has a lower resource usage cost than retrieving the first data from the server device; and
   retrieving, based on the set of access paths, data comprising the first data from the at least one client device of the plurality of other client devices and the second data from the server device.

20. The non-transitory computer-readable medium of claim 19, wherein the resource usage cost analysis is based on at least one of I/O resource usage cost, CPU resource usage cost, or network resource usage cost of respective access paths of the set of access paths.

* * * * *